(12) United States Patent
Meiwes et al.

(10) Patent No.: US 6,889,652 B2
(45) Date of Patent: May 10, 2005

(54) VARIANT-REDUCED THROTTLE DEVICE WITH INTERCHANGEABLE HOUSING PARTS

(75) Inventors: Johannes Meiwes, Markgroeningen (DE); Stefan Josten, Remscheid (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 10/254,912

(22) Filed: Sep. 26, 2002

(65) Prior Publication Data

US 2004/0149257 A1 Aug. 5, 2004

(30) Foreign Application Priority Data

Sep. 26, 2001 (DE) .......................................... 101 47 333

(51) Int. Cl.⁷ .............................................. F02D 11/10
(52) U.S. Cl. ........................ 123/337; 123/556; 251/305
(58) Field of Search ................................ 123/337, 556; 251/305

(56) References Cited

U.S. PATENT DOCUMENTS

| | | | | |
|---|---|---|---|---|
| 4,822,001 A | * | 4/1989 | Sisk ............................ | 251/306 |
| 5,188,078 A | * | 2/1993 | Tamaki ....................... | 123/403 |
| 5,295,507 A | * | 3/1994 | Bandy et al. .......... | 137/614.06 |
| 5,718,202 A | * | 2/1998 | Bentz et al. ............... | 123/399 |
| 6,352,241 B1 | * | 3/2002 | Hannewald et al. ... | 251/129.11 |
| 6,408,817 B2 | * | 6/2002 | Torii et al. ................. | 123/337 |
| 6,427,975 B1 | * | 8/2002 | Powell ....................... | 251/305 |
| 6,446,934 B2 | * | 9/2002 | Bonomi ..................... | 251/306 |
| 6,505,643 B2 | * | 1/2003 | Scholten et al. ........... | 137/554 |
| 6,595,185 B2 | * | 7/2003 | Michels ..................... | 123/337 |
| 6,616,123 B2 | * | 9/2003 | Burian et al. .............. | 251/144 |
| 6,646,395 B2 | * | 11/2003 | Reimann ................... | 318/254 |
| 6,649,111 B2 | * | 11/2003 | Hannewald et al. ....... | 264/278 |
| 6,722,633 B2 | * | 4/2004 | Kawai ........................ | 251/305 |
| 2003/0024576 A1 | * | 2/2003 | Schaefer et al. ........... | 137/554 |
| 2003/0030022 A1 | * | 2/2003 | Michels et al. ............ | 251/305 |

FOREIGN PATENT DOCUMENTS

| EP | 1298299 | * | 4/2003 | .......... F02D/11/10 |
|---|---|---|---|---|
| JP | 120340 | * | 4/2003 | .......... F02D/11/10 |

* cited by examiner

Primary Examiner—Hai Huynh
(74) Attorney, Agent, or Firm—Ronald E. Greigg

(57) ABSTRACT

The invention relates to a throttle device for the intake section of an internal combustion engine, wherein the throttle device has a multi-part housing that contains a throttle valve device in movable fashion, which can be actuated by means of an actuating drive unit. A base housing, which is embodied as an injection molded component and accommodates the throttle valve device, can also accommodate first housing parts of different flange patterns as interfaces with the intake section and additional second housing parts, which are accommodated so that they can move in relation to the base housing, in order to modify the air conduction.

16 Claims, 4 Drawing Sheets

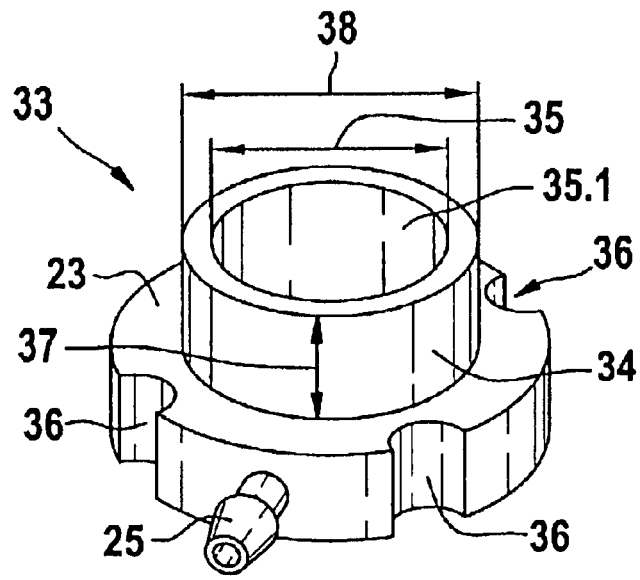
Fig. 4
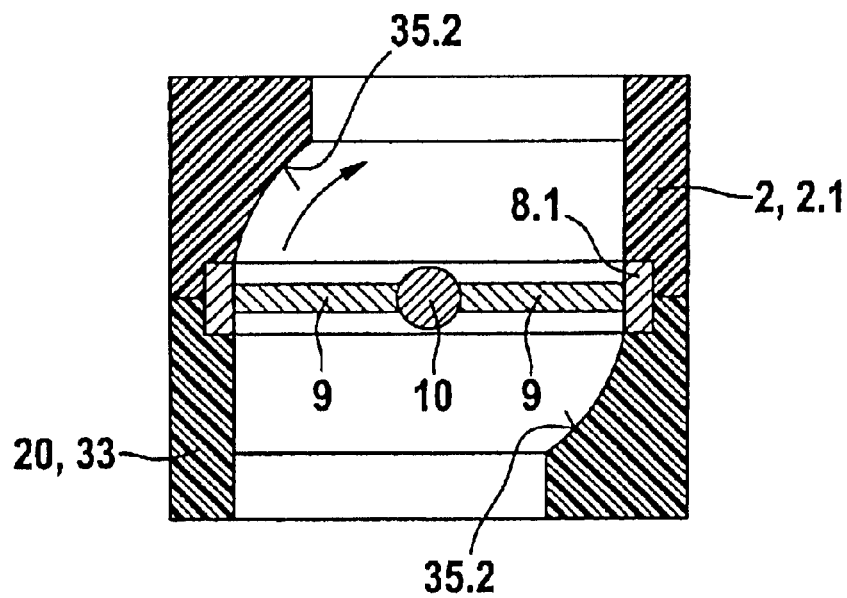
Fig. 4.1

VARIANT-REDUCED THROTTLE DEVICE WITH INTERCHANGEABLE HOUSING PARTS

BACKGROUND OF THE INVENTION

1. Field of the Invention

Throttle devices, which include an aluminum housing, are used in the intake sections of modern internal combustion engines. Depending on the type of engine in which the throttle device is used, a corresponding variant of a throttle device is required, for which a separate diecasting mold must consequently be produced.

The essential variations of the individual throttle devices are the flange pattern, the throttle valve diameter, and the connection geometry in the intake section oriented toward the air filter. Besides these, additional requirements for the throttle device can vary from manufacturer to manufacturer so that separate connection fittings on the housing of the throttle device must be designed and provided.

2. Description of the Prior Art

DE 43 29 522 A1 relates to a throttle device which includes a housing, a throttle valve control unit, a position sensor, and a throttle valve fastened to a throttle valve shaft. The throttle device is disposed between the clean-side air filter connection and the intake apparatus of the internal combustion engine. The air filter connection and/or the intake apparatus are comprised of a plastic material; the individual elements of the throttle device are designed as modules, which can be plugged, screwed, or clamped together. The housing and throttle valve can be made of plastic; the throttle valve shaft in particular is embodied in two parts: the first shaft half supports the module for the position sensor and the other half supports the module for the throttle valve actuating unit.

The subject of DE 195 25 510 A1 is a throttle valve actuating unit provided with a throttle valve fastened to a throttle valve shaft that is supported so that it can rotate in a throttle valve assembly. A servomotor is provided to actuate the throttle valve shaft and has at least one slider and at least one potentiometer track for detecting an actuated position of the throttle valve shaft and an electrical connection to which the servomotor and the potentiometer are connected in a connecting chamber. Furthermore, this disconnecting chamber is closed by a cover. The at least one potentiometer track is affixed to the cover; a coupling part that is part of the electrical connection is formed onto the cover. The cover is also provided with at least one motor plug contact that electrically contacts a mated motor plug contact connected to the servomotor when the cover is mounted onto the throttle valve assembly.

DE 29 49 041 B1 relates to a heating unit for mixture preparation in mixture producers. Between a main throttle element and a fuel supply device, an annular hot water chamber embodied in the form of a heat-exchanging double wall is disposed inside the tube wall, over a part of its longitudinal span. This hot water chamber has a water inlet fitting at one end and a water outlet fitting at the other end. The heat exchanger is connected to a cooling water circuit by means of a thermally controlled emergency valve, which opens once higher temperatures are reached. The inner wall of the heat exchanger adjoining the main flow path of the mixture producer is comprised of an electric heating resistance material and is electrically connected to a voltage source by means of an electric switch element that is thermally controlled as a function of the cooling water temperature and opens once a particular higher water temperature has been reached.

Finally, WO 95/02493 (EP 0 668 816 B1) has disclosed a molded body comprised of plastic. This molded body is produced as a throttle valve housing, in particular by means of an injection molding process. It includes a wall, which adjoins a cavity with an inner wall surface. The wall contains at least one insert piece covered by plastic material in the inner wall surface oriented toward the cavity. The insert piece is tilted at an inclination angle in relation to a normal plane aligned perpendicular to the longitudinal axis. The inclination angle of the insert piece in relation to the normal plane is between 4° and 8°. The insert piece is formed out of metal, in particular a shaped piece of sheet metal. This piece of sheet metal has an upper sheet plane and a lower sheet plane and at least one section is bent out from one of the sheet planes. The insert piece can be provided with deformations, in particular with openings that pass through it.

The embodiments from the prior art cited above all have the disadvantage that they must always be precisely designed for a particular type of internal combustion engine and therefore can only be used in this type of engine.

SUMMARY OF THE INVENTION

The embodiment proposed according to the invention for producing a throttle device for internal combustion engines that includes interchangeable first and second housing parts on the one hand, drastically reduces the multitude of variants, and on the other hand, can reduce the die costs for manufacturing the throttle devices to a corresponding degree.

However, a base housing for throttle devices can be used for a large number of throttle devices if the functions of the air filter connection and flange pattern variance in relation to the internal combustion engine are shifted into separate first and second housing parts. The base housing can be comprised of injection molded plastic components produced using the injection molding process. The corresponding molds, i.e. the plastic injection molds have six times the service life (approx. 1 million housings) compared to aluminum diecasting molds. This largely offsets the disadvantage of high production costs for plastic injection molds since the base housing can be produced in a large run with a single mold.

The variance of the base housing can be increased with first and second housing parts that are likewise produced using the plastic injection molding process; the first and second housing parts can also be made of a material other than plastic, for example metal.

A first housing part can be designed so that it serves as the top housing part of the throttle device and a hot film air mass measuring device can very easily be integrated into this top housing part. The above-mentioned first housing part embodied as a top housing part can cover the multitude of variants with regard to the interface with the air filter and with regard to the different flange patterns, i.e. the disposition of guide sleeves for fastening elements.

A second housing part can contain a water heating unit and vacuum connections. This second housing part can also be used to modify the air conduit; for example, integrating an S-conduit into it can achieve an optimal air conduction in the intake section downstream of the throttle device. The second housing part can be rotated so that it can be used universally. By simply rotating the component in relation to the base housing, the circumference position of the associated fittings and bores can be aligned in relation to the connecting elements; the lengths of the line connections can be embodied to permit optimal, extremely short line paths. This can further reduce the required number of variants.

The universal base housing is generally used with first and second housing parts, which are provided with flange patterns of 50×50 mm or 60×60 mm; the throttle valve diameters used lie between 40 and 48 mm.

BRIEF DESCRIPTION OF THE DRAWINGS

The invention will be described in detail below in conjunction with the drawings, in which:

FIG. 4 shows an enlarged view of the second housing part according to the depiction in FIG. 3, FIG. 4.1 schematically depicts an S-shaped conduit.

DESCRIPTION OF THE PREFERRED EMBODIMENTS

Figure 1:
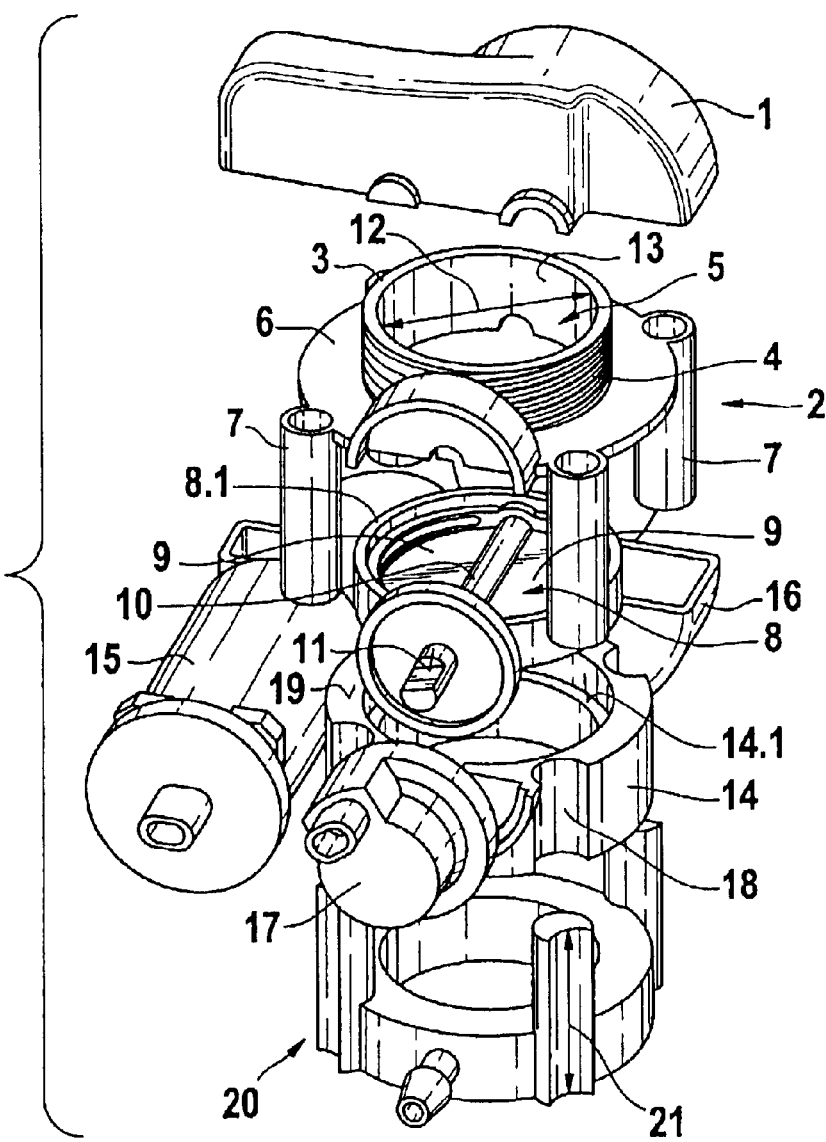
FIG. 1 shows an exploded view of a base housing with a first and second housing part.

FIG. 1 shows an exploded view of a throttle device, which includes a base housing as well as a first and second housing part.

The first housing part 2 of a throttle device includes a throttle fitting 3. The first housing part 2 (short overall height) will be referred to as the top housing part. The throttle fitting 3 of the first housing part 2 is provided with an external thread 4; the throttle fitting 3 encompasses a flow cross section 5. Below the external thread 4 of the throttle fitting 3, the first housing part 2 has a disk-shaped region 6 from which, in the embodiment variant according to FIG. 1, four guide sleeves 7 embodied on the disk-shaped element 6, respectively offset from one another by 90°, extend parallel to the flow cross section 5. In lieu of four guide sleeves 7 distributed over the surface of the disk-shaped element 6, these guide sleeves can also be accommodated in it offset from one another by 120°. In the embodiment variant shown in FIG. 1, the throttle fitting 3 of the first housing part 2 is embodied with a first inner diameter 12.

A base housing 14 is disposed underneath the first housing part (short design) 2. The base housing 14 shown in FIG. 1 has a stop surface 14.1 into which a throttle valve device 8 can be inserted. The throttle valve device 8 includes a valve shaft 10 with symmetrical valve flaps 9 on each side. The valve flaps 9 are encompassed by an enclosure 8.1, which in turn rests against the stop surface 14.1 of the base housing 14. In lieu of the insertable throttle valve device 8 shown here, other throttle valve devices 8 with smaller throttle valve diameters can also be inserted into the base housing 14. On its one end, the valve shaft 10 has a flattened section 11 to accommodate sensor elements. When the throttle valve device 8 is mounted in the base housing 14, the sensor elements, not shown here, that can be accommodated on the flattened section 11 of the valve shaft 10 are enclosed by a sensor housing 17, which is provided with a plug connection. The base housing 14 shown in FIG. 1 also has a housing section, which accommodates an actuating drive unit 15. The actuating drive unit—preferably embodied as an electric motor—is slid into the housing, injection molded onto the base housing 14, and protrudes with its drive element, not shown here, into a bottom housing shell 16, which is injection molded onto the base housing 14. The bottom shell 16 can be closed by a top shell 1 so that the drive elements that can actuate the throttle valve device 8 are sealed in relation to the outside.

Individual recesses 18 distributed over the circumference are embodied in the circumference surface of the base housing 14 and serve as support surfaces for the guide elements 7 of the first housing part 2. The base housing 14 is embodied with a flat end surface 19 upon which the first housing part 2 rests in a sealed fashion with a flat surface, not shown here, so that the throttle valve device 8 inserted into the base housing 14 is affixed to the stop surface 14.1.

A second housing part 20 is shown underneath the base housing 14. The second housing part 20 has struts that correspond to the position of the guide sleeves 7 of the first housing part 2 and are embodied with a height 21. The struts embodied on the circumference of the second housing part 20 can rest with one surface against the recesses 18 on the circumference of the base housing 14 and their surface oriented toward the four guide sleeves 7 of the first housing part 2 can constitute a guide surface for the guide sleeves 7 of the first housing part 2.

Figure 2:
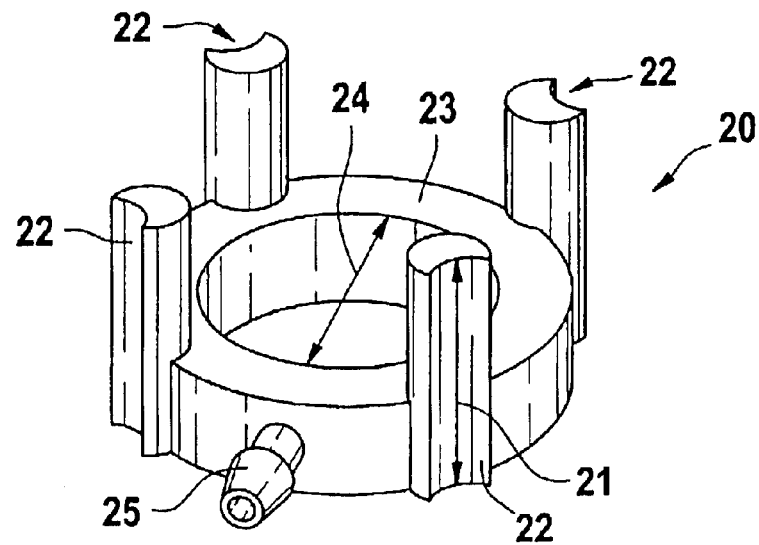
FIG. 2 shows a view of the second housing part in an enlarged scale.

FIG. 2 shows a view of the second housing part in an enlarged scale.

The second housing part 20 has an annular chamber 23 that contains a cavity. A heating medium, whether water or air, can flow into this cavity by means of a connection fitting 25 in order to heat the second housing part 20 of the throttle device over its entire circumference. The annular chamber 23 is embodied with an inner diameter 24. Four strut-shaped guide sections are disposed on the circumference of the annular chamber 23 and their height is labeled with the reference numeral 21. On the side oriented toward the guide sleeves 7 of the first housing part 2, the guide sections are provided with a curvature 22. The curvature 22 corresponds to the curvature of the guide sleeves 7 on the first housing part 2; the guide sections are embodied so that they can be introduced into the recesses 18 on the circumference of the base housing 14.

Figure 3:
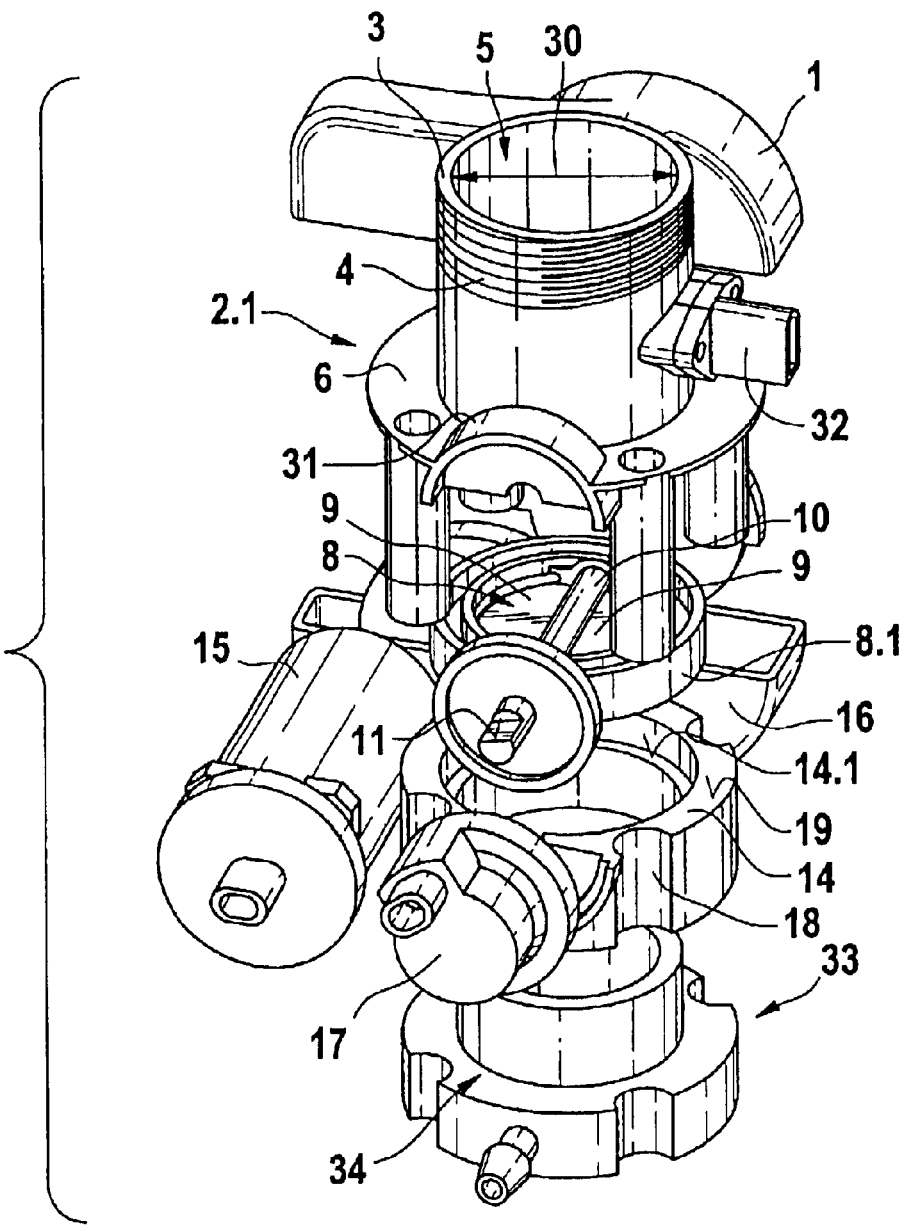
FIG. 3 shows an exploded view of a larger diameter base housing with a first and second housing part that have a flange pattern that differs from the one in FIG. 1.

FIG. 3 shows an exploded view of a larger diameter base housing with a first and second housing part.

Analogous to the depiction according to FIG. 1, the throttle device, which is modularly embodied in a manner similar to the throttle device shown in FIG. 1, has a first housing part 2.1, a base housing 14, a throttle valve device 8 that can be inserted into this base housing, and a second housing part 33.

By contrast with the exploded view of a throttle device according to FIG. 1, the throttle fitting 3 of the first housing part 2.1 (taller design) is embodied with a second diameter 30, which is greater than the first diameter 12 of the throttle fitting 3 of the first housing part 2 (short design) according to the variant in FIG. 1. The base housing also labeled with the reference numeral 14 does not differ from the base housing 14 according to the depiction in FIG. 1. The first housing part 2.1 (tall design) also has a plug connector 32 for a hot film air mass measuring device (HFM). The first housing part 2.1 has a rim 31 that encloses the end of the valve shaft 10, which is provided with a disk-shaped element and on which a flattened section 11 is embodied to accommodate pressure sensors.

The throttle valve device 8 with two flap regions 9 extending symmetrical to the valve shaft 10 is encompassed by an enclosure 8.1, with which the throttle valve device 8 rests against a stop surface 14.1 of the base housing 14. The base housing 14 also has a housing injection molded onto it, which contains an actuating drive unit 15. Analogous to the depiction of the base housing 14 shown in FIG. 1, the drive elements, which drive the throttle valve device 8 are sealed in relation to the outside by a bottom shell 16 and a top shell 1 that can be mounted on it. The circumference of the base housing 14 is provided with recesses 18 whose curvature is embodied so that it corresponds to the diameter of the guide sleeves 7.

Underneath the base housing 14, there is a second housing part 33, which has a transition region 34 formed onto it.

FIG. 4 shows the embodiment of the second housing part according to the depiction in FIG. 3, in an enlarged scale.

The second housing part 33 can include an annular section 23, which adjoins a cavity, which can once again be heated through the introduction of a heating medium—whether heated water or heated air—by means of the connection fitting 25. Recesses 36 in the form of curvatures are embodied in the outer circumference surface of the annular chamber 23 of the second housing part 33. The curvature of these recesses 36 is embodied to correspond to the outer diameter of the guide sleeves 7 of the first housing part 2.1 so that these sleeves can fit snugly against the curvatures 36 of the second housing part 33. The second housing part 33 has a transition region 34, which can be inserted with its outer diameter 36 into the inside of the flow cross section of the base housing 14 and, because of its wall thickness, balances out existing diametrical discontinuities in relation to adjoining intake tube regions in the intake section of an internal combustion engine, i.e. serves to adapt the diameter of the base housing 14 to cover various utilization variants. The height 37 of the transition region 34 is dimensioned so that the second housing part 33 in the base housing 14 is disposed underneath the enclosure 8.1. for the throttle valve device 8. The inner diameter of the second housing part 33 is labeled with the reference numeral 35. The inner diameter of the second housing 33 shown in FIG. 4 is embodied to be constant over the axial length of the second housing part 33, i.e. it produces a cylindrically embodied air conduit in the second housing part 33, which is oriented toward the internal combustion engine.

In an embodiment variant of the inner wall of the second housing part 33, the inner wall can also be embodied as a contoured wall 35.2 (S-conduit). The second housing part 33—which can also be embodied as an injection molded component, can be comprised of a metallic material, or can be comprised of a plastic/metal combination—the inner wall 35.2 is embodied as S-shaped, producing an optimal air conduction in the region downstream of the throttle location. If the wall of the second housing part 33 is provided with the contour 35.2 shown in FIG. 4.1, this permits the combustion air to be supplied to the internal combustion engine in an optimal fashion with regard to flow engineering.

The second housing parts can rotate on the base housing 14, in particular due to the overlap of the transition region 34, which serves to reduce the diameter and to guide of the second housing part. As a result, for example with rotation steps of 90° each, different orientations of the connection fitting 25 can be produced in relation to attached components so that extremely short supply lines are produced and other variants of the second housing part 33 due to different connecting positions can be eliminated.

FIG. 4.1 schematically depicts an S-shaped conduit.

The inner wall of at least one of the first and second housing parts 2, 2.1; 20, 33 can be provided with a contour 35.2 in order to achieve an optimized air conduction downstream of the throttle location. In the depiction in FIG. 4.1, the throttle valve device 8, which can be produced in several diameters according to the client needs, is shown between the first housing part 2 or 2.1 and the second housing part 20 or 33. The S-shaped wall contour 35.2 can also be simply embodied in the wall of the second housing part 20 or 33 in order to optimize the flow cross section for the aspirated air quantity of the internal combustion engine.

Figure 5:
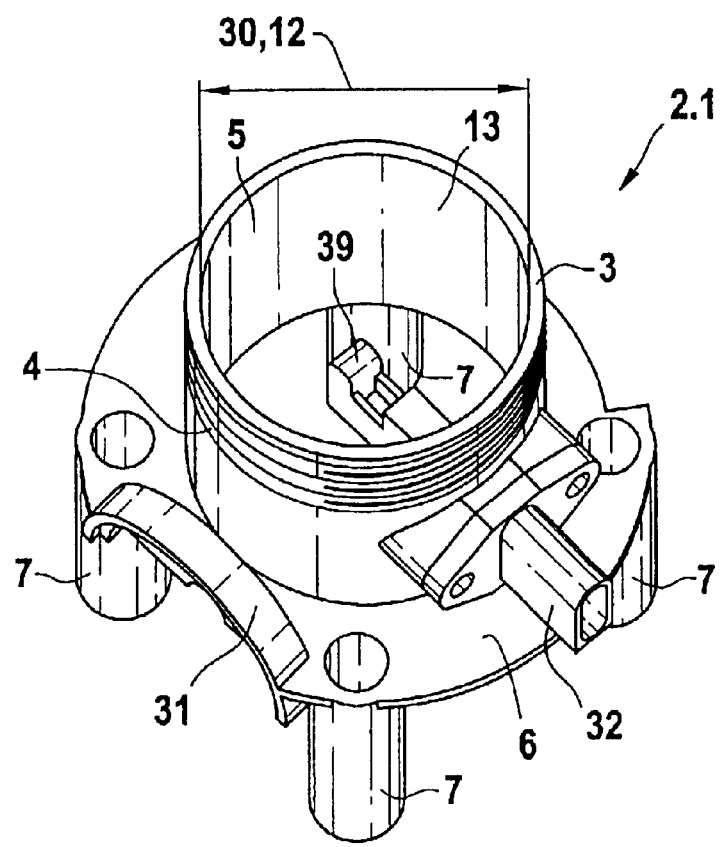
FIG. 5 shows a perspective top view of a tall embodiment of the first housing part in a throttle device.

FIG. 5 shows a perspective top view of the first housing part (tall design), with integrated HFM function.

This depiction shows that an HFM component 39 is integrated into the throttle fitting 3 of the first housing part 2.1. The measurement signals received by this component 39 are transmitted to the control unit of the internal combustion engine by means of a signal line connected to the plug connector 32. This control unit executes a continuous calculation and monitoring of the aspirated air quantity in the intake section of an internal combustion engine. The outer circumference of the throttle fitting 3 of the first housing part 2.1 is provided with an external thread 4 with which the throttle device—which includes the housing components 2.1, 14 and the inserted throttle valve device 8, as well as the second housing part 33—is installed in the intake section of an internal combustion engine.

The inner diameter of the throttle fitting 3, which determines the free flow cross section 5, can be embodied with the first diameter 12 or with the second diameter 30, depending on the variant. In general, throttle devices are used, which have an inner diameter of between 40 and 48 mm. The first housing part 2, 2.1, which performs the function of an interface with the air filter end of the intake section of an internal combustion engine, has a disk-shaped element 6, whose base is embodied on an order of magnitude between 50×50 mm and 60×60 mm, i.e. in different flange patterns, and constitutes the interface oriented toward the air filter. An arched region 31 is embodied on the disk-shaped element 6, which can have guide sleeves 7 injection molded onto it on opposite sides when the first housing part 2, 2.1 is embodied as an injection molded plastic part 4. The arched region 31 constitutes the rim around a disk shaped element that can be injection molded onto the valve shaft 10 of the throttle device 8 according to the embodiment variants shown in FIGS. 1 and 3. The guide sleeves 7 extend from the disk-shaped component 6, parallel to the flow cross section 5 of the first housing part 2.1. Besides having an HFM component 39 integrated into the inside of the flow cross section 5 of the first housing part 2.1, a tank ventilation unit can also be provided in it.

Figure 6:
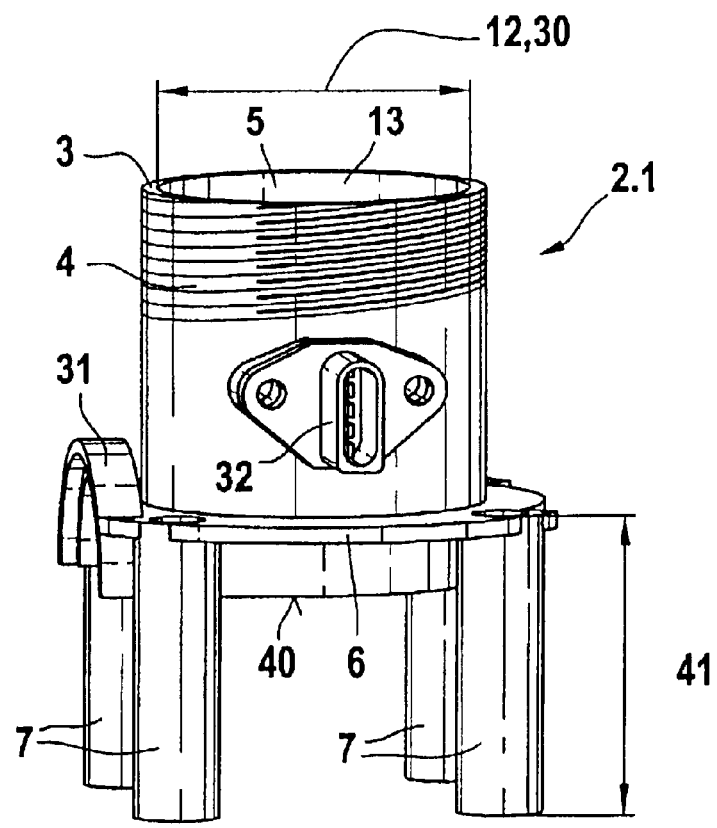
FIG. 6 shows a side view of the first housing part according to FIG. 5.

FIG. 6 shows a side view of the first housing part 2.1 disposed on top of a base housing.

As has already been mentioned in connection with the description of FIG. 5, the first housing part 2.1 can have a first inner diameter 12 or a second inner diameter 30, which determine the free flow cross section 5 in the throttle fitting 3. A plug connector 32 for the HFM component 39 inside the throttle fitting 3 is disposed underneath an externally threaded section 4 on the throttle fitting 3.

Underneath the disk-shaped element 6, a flat surface 40 is provided, with which the first housing part 2.1 (tall design) is placed onto the associated, corresponding end face 19 of the base housing 14 after the throttle valve device 8—as a modular component—has been inserted into this base housing 14. Depending on their height 41, the guide sleeves 7 of the first housing part 2.1 extend along the base housing 14 and are aligned with either the recesses 18 provided on the outer circumference surface of the base housing 14, with recesses—i.e. curvatures 22—on the four guide sections of the second housing part 20 according to the depiction in FIG. 2, or with curvatures 36 in the annular chamber region 23 of the second housing part 33 (reduced diameter) according to the depiction in FIG. 4.

Thanks to the modular design of the throttle device proposed according to the invention, according to FIG. 3, throttle valve devices 8, which correspond to the inner diameter of the stop surfaces 14.1 of the base housing 14 according to FIG. 1, can be placed onto these stop surfaces 14.1. These throttle valve devices rest with their respective enclosures 8.1 on the above-mentioned stop surfaces 14.1. It is also possible to install throttle valve devices 8 with a smaller valve diameter into the base housing 14. Analogous to this modular design, the first housing part 2 or 2.1 with its corresponding flange pattern as well as those first and second housing parts 2, 2.1; 20, 33 with larger flange patterns, i.e. 60×60 mm to cite an example, can fit into any base housing 14.

In first and second housing parts 2, 2.1; 20, 33 that have a flange pattern, which permits the use of a throttle device with a base housing 14 in an internal combustion engine that requires large intake air quantities, the guide sleeves 7 are shifted further outward so that the corresponding second housing parts 20, 33 with fitting flange patterns are used on the base housing 14. The base housing 14 used, however, always has the same structure, which allows throttle valve devices 8 embodied with various diameters to be inserted into it. In this case, the flow cross sections are adapted by using a second housing part 33 with a diameter-reducing transition region 34 in comparison to the free flow cross section 5.

The foregoing relates to preferred exemplary embodiments of the invention, it being understood that other variants and embodiments thereof are possible within the spirit and scope of the invention, the latter being defined by the appended claims.

We claim:

1. A throttle device for the intake section of an internal combustion engine, the throttle device comprising
   a multi-part housing containing a throttle valve device (8) in movable fashion, which throttle valve device (8) can be actuated by means of an actuating drive unit (15), and
   a base housing (14) embodied as an injection molded component and accommodating the throttle valve device (8), the base housing part (14) also accommodating first housing parts (2.1) of different flange patterns as interfaces with the intake section and additional second housing parts (20, 33), which are mounted for movement in relation to the base housing (14) in order to modify the air flow through the device.

2. The throttle device according to claim 1 wherein the first housing parts (2, 2.1) and second housing parts (20, 33) are embodied as injection molded plastic parts.

3. The throttle device according to claim 1 wherein the first housing parts (2, 2.1) and second housing parts (20, 33) are comprised of metallic material.

4. The throttle device according to claim 1 further comprising a hot film air mass measuring component (39) integrated into a first housing part (2.1).

5. The throttle device according to claim 1 wherein the first housing parts (2, 2.1) comprises guide sleeves (7), which extend from a plate-shaped section (6), parallel to the flow direction of the air flow through a flow cross section (5).

6. The throttle device according to claim 1 further comprises a tank ventilation unit disposed on the first housing parts (2, 2.1).

7. The throttle device according to claim 1 wherein the throttle valve device (8) that corresponds to the inner diameter (12, 30) of the base housing (14)—and any throttle valve device of a smaller diameter—can be inserted into the base housing (14).

8. The throttle device according to claim 7 wherein throttle valve device (8) comprises an enclosure, which rests against a stop surface (14.1) in the base housing.

9. The throttle device according to claim 1 wherein the base housing (14) and/or the second housing parts (20, 33) contain a cylindrically shaped air conduit (35.1).

10. The throttle device according to claim 1 wherein the base housing (14) and/or the second housing parts (20, 33) contain a contoured air conduit (35.2).

11. The throttle device according to claim 1 wherein the base housing (14) or the second housing parts (20, 33) are components of the intake section of an internal combustion engine.

12. The throttle device according to claim 1 wherein the base housing (14) and/or the second housing parts (20, 33) comprises connections (25) for a housing/adapter part (23) that can be heated.

13. The throttle device according to claim 1 wherein the second housing parts (20, 33) have transition regions (34) formed onto them, the transition regions having an inner diameter (35) and/or an outer diameter (38) that can be used to balance out diametrical differences between the base housing and the intake tube.

14. The throttle device according to claim 1 wherein the base housing (14) can accommodate the first housing parts (2, 2.1), the first housing parts (2,2.1) including guide sleeves (7) corresponding to recesses (18, 22, 33) of the base housing (14) and to the second housing parts (20, 33).

15. The throttle device according to claim 1 wherein the base housing (14) can accommodate first housing parts (2, 2.1) with fitting flange patterns as well as with any larger flange pattern.

16. The throttle device according to claim 1 wherein throttle valve devices (8) of a first diameter as well as throttle valve devices (8) of a smaller diameter can be accommodated between the base housing (14) and the second housing parts (20, 33).

* * * * *